Feb. 5, 1963

A. D. LANTZ 3,076,866

SUSPENSION APPARATUS FOR BUNDLE CONDUCTORS

Filed April 21, 1960

INVENTOR.
ALPHA D. LANTZ
BY
Kenneth W. Miller
ATTORNEY

Feb. 5, 1963     A. D. LANTZ     3,076,866
SUSPENSION APPARATUS FOR BUNDLE CONDUCTORS
Filed April 21, 1960     3 Sheets-Sheet 2

*INVENTOR.*
ALPHA D. LANTZ
BY
*Kenneth W. Miller*
ATTORNEY

Feb. 5, 1963 A. D. LANTZ 3,076,866
SUSPENSION APPARATUS FOR BUNDLE CONDUCTORS
Filed April 21, 1960 3 Sheets-Sheet 3

INVENTOR.
ALPHA D. LANTZ
BY
ATTORNEY

United States Patent Office 3,076,866
Patented Feb. 5, 1963

3,076,866
SUSPENSION APPARATUS FOR BUNDLE
CONDUCTORS
Alpha D. Lantz, Barberton, Ohio, assignor to The Ohio
Brass Company, Mansfield, Ohio, a corporation of
New Jersey
Filed Apr. 21, 1960, Ser. No. 23,828
19 Claims. (Cl. 174—149)

This invention relates to power transmission lines and more particularly to lines constituted by a plurality of part conductors connected and arranged as a single or phase conductor of the line.

In the art pertaining to high voltage transmission of electrical energy by means of elevated transmission lines, it is known to associate a plurality of conductor cables, referred to as part conductors, in spaced adjoining relationship, with the several cables connected so that they function together as a single conductor of the line. Such line arrangements are designated as bundle conductors in the United States and are constituted by two, three, four or even more cables for each line conductor. Several cables of each conductor are suspended from the line towers by suspension apparatus suitable for carrying the several cables of the conductors in insulated relation to the tower.

In the utilization of such transmission lines, the proximity of the several cables of each phase conductor has constituted a substantial design and engineering problem. Particularly, the cables must be suspended with small spacings, considering the span distances involved, in order to achieve the advantages and results intended. This requirement leads to a multiplicity of mechanical problems, e.g. vibration and swinging of the cables, entanglement of the cables, and instability generally. Other problems arise at the suspension points and elaborate and costly arrangements of suspension plates and suspension insulators have been resorted to for maintaining the attitude of the apparatus.

The present invention is concerned with a suspension apparatus suitable for use wtih bundle conductors and is concerned specifically with mechanical arrangements such that the several cables which constitute a phase conductor are supported in a stable way. In accordance with the invention, the several cables are carried by a suspension plate which is coupled to and suspended from one or more strings of suspension insulators. The configuration and design of the suspension plate is such that forces tending to displace the suspension plate and associated cables from the neutral position are opposed by forces developed inherently by the weight of the conductors in relation to the spaced disposition due to the shape of the suspension plate. Specifically disturbing forces exerted by wind, ice unloading, and the like, are opposed according to the extent of displacement from the neutral position and the entire assemblage is rapidly returned to its neutral position.

The suspension plates described herein are advantageous in that the top two conductors of the bundle conductor may be suspended in the proximity of the insulator string without damage to the lower insulators of the string.

The invention together with the objects, features and advatnages thereof will be understood from the following detailed specification and claims, taken in connection with the appended drawings. In the drawings:

Figure 1:
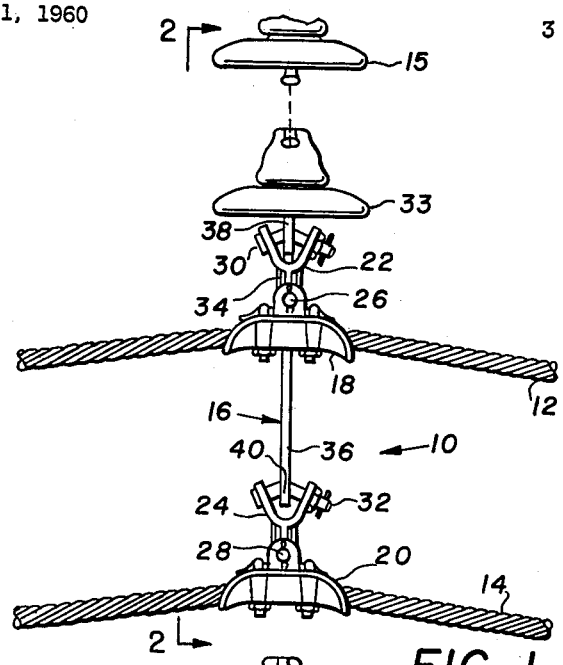
FIG. 1 illustrates a suspension apparatus for a bundle conductor in accordance with the invention.
Figure 2:
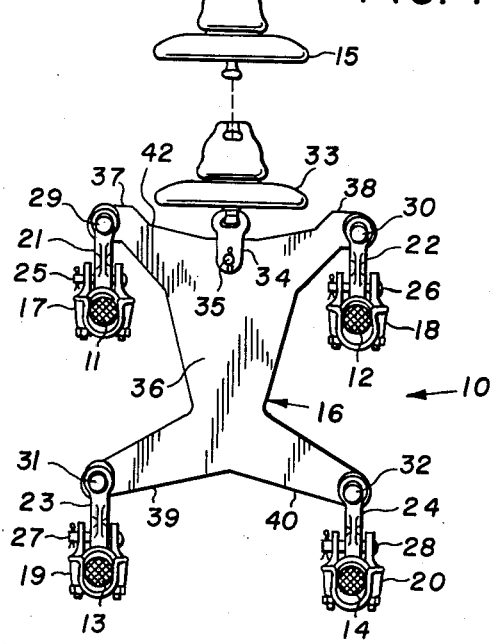
FIG. 2 is a view of the suspension apparatus of FIG. 1, taken in the direction 2—2 in FIG. 1, showing the suspension plate and the disposition of the conductor cables.
Figure 4:
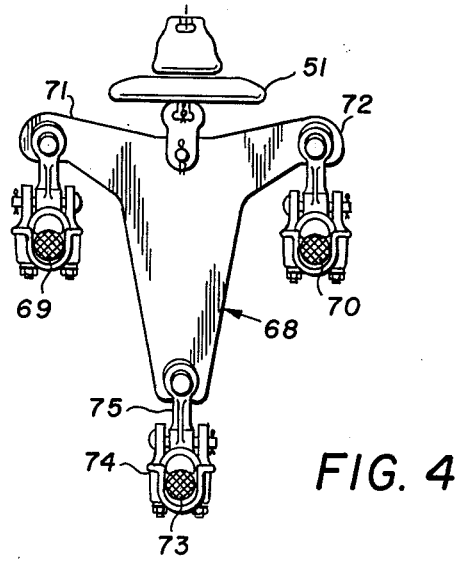
Figure 5:
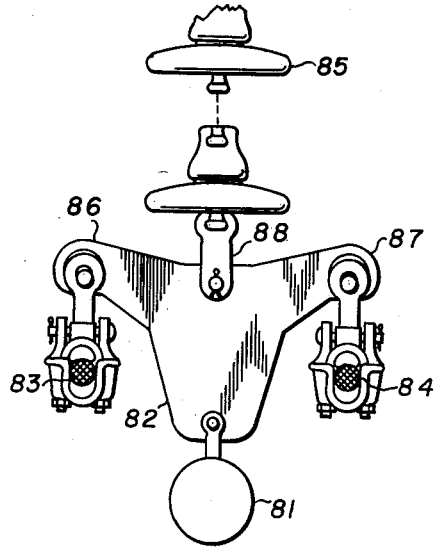
Figure 6:
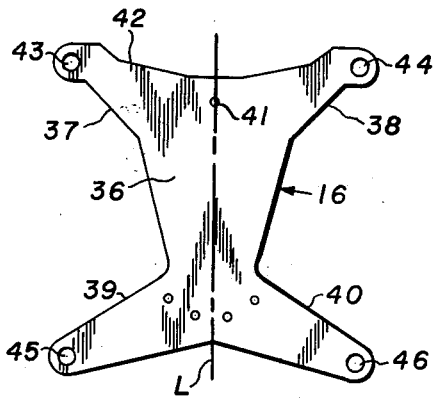
Figure 7:
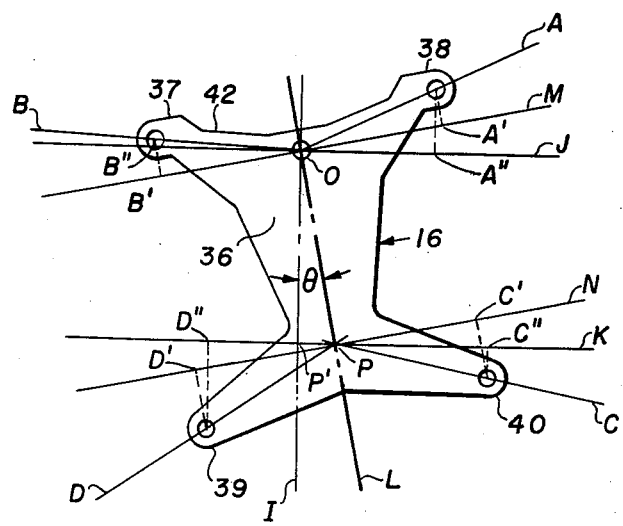

FIG. 4 illustrtaes an embodiment of the invention in a suspension apparatus for a three cable bundle conductor;

FIG. 5 illustrates an embodiment of the invention in a suspension apparatus for a two cable bundle conductor;

FIG. 6 is a view of the suspension plate of the apparatus of FIGS. 1 and 2, shown separately; and FIG. 7 is a graphical representation illustrating the effects achieved in the practise of the invention.

Refering now to FIGS. 1, 2 and 6, there is shown a transmission line apparatus 10 in which four conductor cables 11, 12, 13 and 14 are carried by means of a string of suspension insulators 15. The conductors 11 to 14 are suspended from a suspension plate 16 by means of suspension clamps 17, 18, 19 and 20. The clamps 17 to 20 are connected to the suspension plate 16 by means of links 21, 22, 23 and 24, pins 25, 26, 27 and 28 and bolts 29, 30, 31 and 32. The suspension plate 16 is connected to the end insulator 33 of the insulators 15 by means of a socket link 34 and pin 35. The link 34 is formed as a socket connector at the top extremity thereof for receiving a ball connector of the insulator 33, and as a clevis at the bottom end to receive the pin 35 which extends through the link and the plate.

The suspension plate 16 is formed as a unitary body part 36, two upper suspension arms 37 and 38, and two lower suspension arms 39 and 40. The two upper arms 37 and 38 extend symmetrically in opposite directions from the center of the plate in the transverse direction (denoted by the line L in FIG. 6) and generally in an upward direction with reference to the body part 36 of the plate and the opening 41, for the pin 35. The arms 37 and 38 define a recess, designated generally at 42, which determines the limit of pivotal movement of the suspension plate about the pin 35. The arms 37 and 38 have openings 43 and 44 adjacent the outward extremities thereof for receiving the pins 29 and 30.

The arms 39 and 40 extend symmetrically outward in opposite directions from the bottom of the body part 36 and generally downward with reference to the body part and to the opening 41. The arms 39 and 40 have openings 45 and 46 adjacent the outward extremities of the arms, in alignment with the openings 43 and 44 in the the arms 37 and 38, for receiving the pins 31 and 32.

Considering that part of the suspension apparatus which includes the upper portion of the plate 16, the line conductors 11 and 12, suspension clamps 17 and 18, the link 34 and the pin 35, it will be seen that a system constituted by those parts alone would be in unstable equilibrium. Thus a displacement of the suspension plate 16, about the pin 35 from the balanced position such that the line conductor 12 and clamp 18 move in the downward direction and the line conductor 11 and clamp 17 move in the upward direction, results in an increase in the length of the effective moment arm of the conductor 12 and clamp 18 and a reduction in the length of the effective moment arm of the conductor 11 and clamp 17. Hence, the displacement produces an increase in moment arm of forces tending to cause displacement and a reduction in the moment arm of forces tending to oppose displacement. Accordingly, any disturbance causing a displacement of the plate in the assumed direction results in a further displacement until the arm 37 engages the insulator 33. Conversely, a displacement of the plate such that the line conductor 11 moves in the downward direction and the line conductor 12 moves in the upward direction results in engagement of the arm 38 with the insulator 33.

Again, considering that part of the suspension apparatus which includes the suspension plate 16, the line conductors 13 and 14, suspension clamps 19 and 20, the link 34, and the pin 35, it will be seen that a system constituted by those parts lone would be in stable equilibrium. Thus a displacement of the suspension plate 16 from the balanced position of the plate about the pin 35, such that the line conductor 14 and clamp 20 move in the downward direction and the line conductor 13 and clamp 19 move in the upward direction, results in a reduction of the effective moment arm of the conductor 14 and clamp 20 and an increase in the effective moment arm of the conductor 13 and clamp 19. Moreover, the turning movement of the suspension plate about the pin 35 tends to lift the center of mass of the system against the force of gravity. Accordingly, the displacement produces forces tending to reduce the forces of displacement away from the balanced position and, additionally, to produce an increase in forces tending to return the system toward the balanced position. Displacement in the opposite direction likewise produces forces tending to return the system to the balanced position.

In the complete suspension arrangement shown the forces tending to prevent turning of the suspension plate 16 about the pin 35, due to the action of the conductors 13 and 14 upon the arms 39 and 40, is greater than the forces tending to produce turning, due to the action of the conductors 11 and 12 upon the arms 37 and 38. Thus the symmetrical offset of the cables 13 and 14 on opposite sides of the line of action of the cables (e.g. the line L)—referred to the bolts 31 and 32—and the distance from the center of action to the pin 35 produces a torque tending to return the entire assembly to the balanced or center position which is much greater than the torque due to the cables 11 and 12 tending to turn the assembly away from the balanced position.

This effect would exist, at least for small movements of the assembly, even though the arms 39 and 40 were directed horizontally from the bottom of the center part of the plate. In fact, in the arangement shown the depression of the arms 39 and 40 below the horizontal results in an increase in the movement arm of the one of the arms disposed in the direction of turning movement tending to return the assembly to the balanced position. Some further effect is due to the fact that the average angle of depression from the horizontal position of the arms 39 and 40 is somewhat greater than the angle of elevation of the arms 37 and 38 from the horizontal. Additionally, of course, the mass of the plate 16 is effective to produce a component of force tending to return the plate to the equilibrium position, as described above, although this force is small in comparison to that due to the organization and relative positioning of the arms 37 to 40.

The functioning of the apparatus will be evident from FIG. 7, wherein the suspension plate 16 of FIG. 6 is represented as displaced from the balanced position by an angle $\theta$, indicated with respect to the axis lines I and L. The axis lines L, M and N are referred to the plate 16 and the lines M and N extend through the plate in a horizontal direction, normal to the line L through the pivot point O at the center of the opening 41, and normal to the line L through the center of action P of the arms 39 and 40, respectively. The axis lines J and K are referred to the balanced position of the plate, i.e. normal to the line I and are in the same position as the axis lines M and N when the plate 16 is in that position.

In the position $\theta$, the disposition of the plate 16 is such that the line of action A of the arm 38 with respect to the pivotal center O, i.e. the center of the opening 44, is displaced upward with respect to the axis line J. Accordingly, the effective moment arm of the conductor 12 is decreased from the distance OA' along the axis line M to the distance OA" on the axis line J. Conversely, the line of action B of the arm 37 is displaced downward with respect to the axis line J and the effective moment arm of the line conductor 11 is increased from the distance OB' on the axis M to the distance OB" on the axis line J. Accordingly, since the restoring force due to the weight of the conductor 12 is decreased with increase of the angle $\theta$ and the opposing force due to the weight of the conductor 11 is increased with increase of the angle $\theta$, the displacement produces an increase in the force tending to move the plate away from the balanced position.

However, the disposition of the plate 16 is such that the line of action C of the arm 40 with respect to the center of action P of the two arms 39 and 40 is displaced circularly about the pivotal center O away from the axis line K and the effective moment arm of the line conductor 14 is increased from the distance PC' on the axis line N to the distance P'C" on the axis line K. Again, the line of action D of the arm 39 is displaced downward with respect to the axis line K and the effective moment arm of the line conductor 13 is decreased from the distance PD' on the axis line N to the distance P'D" on the axis line K. Accordingly, since the restoring force due to the weight of the conductor 14 increases with the increase of the angle $\theta$ and the opposing force due to the weight of the conductor 13 decreases with the increase of the angle $\theta$ the displacement produces an increase in the forces tending to move the plate toward the balanced position. As will be evident, the net increase in effective torque at the arms 39 and 40 is greater than the net decrease in torque at the arms 37 and 38 so that there is a net restoring force tending to return the apparatus to the balanced position from the displaced position $\theta$.

It will now be understood that weight of the conductors 13 and 14 acting upon the arms 39 and 40 is effective to produce restoring forces greatly in excess of the disturbing forces due to the weights of the conductors 11 and 12 acting upon the arms 37 and 38. This is evident from the relative changes in the lengths of the effective moment arms inasmuch as the weights of all the conductors and related apparatus are assumed to be equal. The additional stabilizing effect of the mass of the plate and the difference between the angles of elevation and depression of the upper and lower arms has been mentioned.

In the suspension plate shown in FIGS. 1 and 2 the average angle of elevation of the upper arms 37 and 38 was 15° from the horizontal. The average angle of declination of the lower arms was 20° from the horizontal. The distance from the pivot 41 to the bottom of the plate along the center line L was 13 inches for the plate shown in FIGS. 1 and 2 wherein the spacing between the line conductors and horizontal and vertical direction was 16". These dimensions are, of course, representative only, inasmuch as the values actually utilized will be subject to a wide range of design variation.

Figure 3:
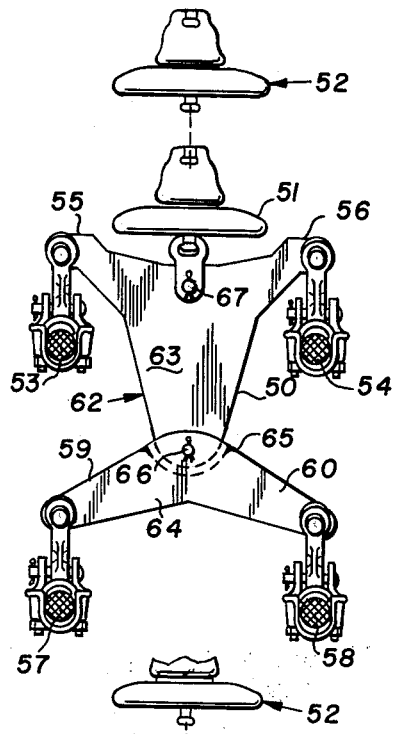
FIG. 3 illustrates an embodiment of the invention in a suspension apparatus for a four cable bundle conductor.

In the apparatus of FIG. 3 a suspension plate 50 is suspended from the lower insulator 51 of a string of insulators 52; two upper conductor cables 53 and 54 are carried on two upwardly extending suspension arms 55 and 56 and two lower conductor cables 57 and 58 are carried on two downwardly extending arms 59 and 60. The arms 55, 56, 59 and 60 are disposed and arranged according to the same considerations set forth above in connection with the suspension plate 16 of FIGS. 1 and 2 in order to achieve stable suspension of the conductor cables 53, 54, 57 and 58. However, the suspension plate 50 is formed in two parts, of which the top part 62 is constituted by a central or body part 63 with the upper arms 55 and 56 formed as an integral part thereof. The bottom part 64 has the arms 59 and 60 formed as an integral piece, with two spaced yoke pieces, indicated generally at 65, in which the lower extremity of the part 63 is received. A pin 66 extends through the pieces 65 and the part 63 so that the bottom part 64 pivots freely on the lower end of the upper part 62.

As will be evident from the prior discussion, the assembly which includes the top part 62 and the upper conductor cables 53 and 54 is in unstable equilibrium with respect to pivotal movements about the pin 67, in the absence of the bottom part 64 and the conductors 57 and 58. The lower part 64 and the conductors 57 and 58 are, however, in stable equilibrium with respect to pivotal movements about the pin 66 so that the conductor cables 57 and 58 maintain their level orientation. Since the part 64 is free to pivot about the pin 66, it is necessary that the weight of the part 63 and conductor cables 57 and 58, referred to the distance from the pin 66 to the pin 67, together with the distance from the center of gravity of the top part 62 to the pin 66, taken with the conductor cables 53 and 54, provide a restoring force sufficient to overcome the disturbing force due to the upper conductor cables 53 and 54. The entire assembly is accordingly maintained in stable equilibrium, although the stabilizing forces are less than that of the arrangement of FIG. 1 and 2, in the balanced position of the parts.

In the arrangement of FIG. 4, the suspension plate 68 is similar to the top part 62 of the suspension plate 50 and carries two conductor cables 69 and 70 from two upwardly extending upper arms 71 and 72. A single conductor cable 73 is suspended from the lower end of the suspension plate 68 by means of a suspension clamp 74 and a suspension link 75. As in FIG. 3, the weight of the conductor cable 73 and a portion of the weight of the strain plate 68 and the conductor cables 71 and 72 tend to maintain the assembly in a balanced position against the unstable forces produced as a result of the upward disposition of the arms 71 and 72. The arms 71 and 72 are arranged at a somewhat lesser angle of elevation with respect to the horizontal than the upper arms of the strain plates 16 and 50 because of the lesser stabilizing force produced by the conductor cable 73.

The suspension plates 16 and 68 and the top part 62 of the suspension plate 50 are cut and punched from flat steel plate. The bottom part 64 of the suspension plate 50 is formed by welding two arcuate pieces on opposite sides of a flat piece which has been formed to the outline of the arms. Other suitable and convenient methods of manufacture may be used, however, and no limitation as to the method of manufacture is imported by use of the term "plate" herein.

The suspension apparatus of FIG. 5 is similar to that of FIG. 4, except that the cable conductor 73 and suspension clamp 74 in the apparatus of FIG. 4 are replaced by mass member 81 which functions as a stabilizing means in accordance with the principles set forth in connection with the embodiment of FIGS. 1 and 2, and the embodiments of FIGS. 3 and 4. The suspension plate 82 which carries the conductor cables 83 and 84 from the insulator string 85 is generally similar to the suspension plate 68 of FIG. 4 with the arms 86 and 87 disposed at a somewhat lesser angle of elevation from the horizontal than the upper arms of the strain plates in FIGS. 1, 2 and 3. The center part of the suspension plate 82 is shorter than the center part of the suspension plate 68, since the reduction in effective moment arm about the pivotal connection with the link 88 may be compensated for by increase in the size of the weight 81, although this is a matter of design preference. The arrangement in FIG. 5 is useful for certain two conductor bundles, whereas the arrangement in FIG. 4 is useful for three conductor bundles.

The most important result achieved by practice of the invention is that the overall length of the insulator-conductor assembly is substantially reduced because of the closer proximity of the upper two conductors to the insulator string. This is due to the fact that every inch of assembly length which is saved, results in a like saving of tower height.

Again, while the improvement and stability of the mechanical system is described herein with respect to static or semi-static conditions, the factors which promote improvement of stability in that respect relate also to resistance to upset brought about by dynamical conditions, whipping of the conductors, traveling waves, conductor galloping, and the like. The factors relating to stability under such conditions must, however, be a matter of design compromise in order to obtain short coupling of the suspension plate and proximity of the two conductors to the suspension string while achieving the desired stabilizing effect.

It is to be understood that the foregoing description is not intended to restrict the scope of the invention and that various rearrangements of the parts and modifications of the design may be resorted to. The following claims are directed to combinations of elements which embody the invention or inventions of this application.

I claim:

1. In transmission line apparatus, in combination, an insulator, a rigid suspension plate carried by the said insulator with means pivotally connecting the said insulator to the suspension plate at the top central part thereof for relative movement at least in the plane of the suspension plate, two arms at the top of the suspension plate extending symmetrically outward on opposite sides of the plate, and a part of the said suspension plate extending downward and away from the said insulator in alignment with said connecting means, two conductor cables and suspension means therefor connected to the said two arms at points symmetrically disposed on opposite sides of and spaced toward the insulator from the pivot point of the insulator connecting means, and stabilizing means at the lower extremity of the said suspension plate, characterized at least by the weight thereof, for producing forces tending to restore the said apparatus to a balanced position greater than forces due to the line conductors tending to disturb the said apparatus from the balanced position.

2. In transmission line apparatus, in combination, a plurality of insulators in series string arrangement, a rigid suspension plate carried at the lower extremity of the said insulator string, means connecting the said insulator string to the suspension plate at the top central part thereof with a pivotal connection between the said means and the said plate for relative movement in the plane of the suspension plate, two arms at the top of the suspension plate extending symmetrically outward on opposite sides of the plate and toward the said insulator string, and a part of the said suspension plate extending downward and away from the said insulator string in alignment with said connecting means, two conductor cables arranged on opposite sides of the suspension plate and suspension means therefor with pivotal connections to the said two arms, the said pivotal connections between the suspension means for the conductors and the two arms being symmetrically disposed on opposite sides of and spaced in the direction of the insulators from the pivotal connection between the insulator connecting means and the plate, and stabilizing means at the lower extremity of the said suspension plate, characterized at least by the weight thereof, for producing forces tending to restore the said apparatus to a balanced position greater than the forces due to the conductor cables tending to disturb the said apparatus from the balanced position, the said stabilizing means having the weight thereof distributed with respect to the said pivotal connection such that the sum of the products of the weights by the effective moment arms of the various parts of the said stabilizing means exceeds the sum of the products of the weights by the effective moment arms of the said two conductor cables.

3. The invention in accordance with claim 2 in which the said stabilizing means is constituted as an integral extension of the suspension plate with two oppositely extending arms equally depressed with respect to the horizontal, and two conductor cables carried by the said arms.

4. The invention in accordance with claim 3 in which the two arms at the top part of the suspension plate extend toward the insulator string at an angle of elevation with respect to the first named pivotal connection less than the angle of depression of the last named two arms.

5. The invention in accordance with claim 2 in which the said stabilizing means is constituted by an ancillary plate connected to the suspension plate in the form of two oppositely extending arms and two conductor cables carried by the said arms.

6. The invention in accordance with claim 2 in which the said stabilizing means is constituted by a third conductor cable.

7. The invention in accordance with claim 2 in which the said stabilizing means is constituted by a mass member.

8. In accordance with claim 2 in which the body and two top arms of the suspension plate define a recess for permitting pivotal movements of the suspension plate with respect to the insulators while minimizing the distance between the suspension plate and the insulators.

9. The invention in accordance with claim 8 in which the conductor cables are suspended from the outward extremities of the top arms of the suspension plate for vertical proximity of the conductor cables to the insulators.

10. In an electrical transmission line, line conductor apparatus comprising a plurality of part conductors, and suspension means for the part conductors comprising an insulator, a suspension member extending transversely between the part conductors with means pivotally connecting the insulator to the member adjacent one longitudinal extremity thereof for pivotal movement of the conductor apparatus perpendicular to the direction of the conductors, means on the suspension member adjacent the said one extremity thereof carrying two of the part conductors in laterally spaced relation, said means extending equally toward the insulators on opposite sides thereof from the pivot point of the said pivotal connecting means, and means on the suspension member adjacent the remaining longitudinal extremity thereof carrying the remaining said part conductors in longitudinally spaced relation from the said two part conductors.

11. The invention in accordance with claim 10 in which there are three part conductors and the suspension member is a substantially Y-shaped plate with the insulator pivotally connected to the plate at the yoke of the Y, the said two part conductors suspended from the extremities of the arms of the Y, and the third conductor suspended from the stem of the Y.

12. The invention in accordance with claim 11 in which the portion of the suspension member comprising the stem of the Y is longer than that portion of the member comprising the arms of the Y.

13. The invention in accordance with claim 10 in which there are four part conductors and the suspension member has two parts symmetrically opposed to said means on the suspension member adjacent the said one extremity thereof for carrying the remaining two part conductors.

14. The invention in accordance with claim 10 in which said means on the suspension member adjacent the said one extremity thereof are spaced apart and symmetrically inclined with respect to the insulator for increased movement of the suspension member with respect to the insulator without contact between the means and the insulator.

15. Transmission apparatus comprising a bundle conductor assembly constituted by a plurality of conductor cables; a suspension member extending between the cables in a direction transverse to the direction of the cables and holding the cables in spaced relation; means attaching the cables to the said suspension member; and suspension means for the said assembly including means pivotally connected to the said suspension member; the said suspension member having integral parts oppositely disposed with respect to longitudinal and transverse axes through the pivotally connected means on which the conductor cables are carried, all for opposing pivotal movements of the conductor assembly with respect to the said suspension means in the said direction transverse to the direction of the cables.

16. A suspension plate for transmission line apparatus constituted by a metallic body having means for pivotally connecting a suspension insulator at one longitudinal extremity and centrally of the body in the transverse direction thereof, two arms extending symmetrically outward in the transverse direction and away from the body in the longitudinal direction thereof at each side of the said means, and the body extending longitudinally away from the said arms with means at the remaining longitudinal extremity thereof for carrying stabilizing means for the apparatus.

17. A suspension plate in accordance with claim 16 in which the body has two arms at the said remaining extremity thereof symmetrically opposed to the said two arms in the longitudinal direction of the body and comprising the last named means.

18. A suspension plate in accordance with claim 17 in which the body is in two parts and the two arms at the said remaining extremity of the body comprise a separate part connected to the remaining part of the said body by a pivotal connection with the arms extending equally in the transverse directions from the said pivotal connection.

19. A suspension device for use in transmission line apparatus having a plurality of conductor cables and a suspension insulator comprising a metallic body having means adjacent one extremity in the longitudinal direction thereof and centrally in the transverse direction thereof for pivotal connection with the suspension insulator, two arms extending transversely outward from the body and symmetrically in opposite directions therefrom adjacent the said one extremity for carrying two conductor cables on opposite sides of the said pivotal means, the body extending longitudinally away from the said means, and two arms extending transversely outward from the body and symmetrically in opposite directions therefrom at points spaced in the longitudinal direction of the body from the said pivotal means for carrying two conductor cables vertically below the first named two cables, all in laterally stable relation with respect to the insulator.

References Cited in the file of this patent

UNITED STATES PATENTS

| 658,779 | Huntress | Oct. 2, 1900 |
| 1,078,711 | Whitehead | Nov. 18, 1913 |
| 1,572,610 | Lacks et al. | Feb. 9, 1926 |
| 1,680,053 | Lawson | Aug. 7, 1928 |
| 2,526,917 | Wheeler et al. | Oct. 24, 1950 |
| 2,933,549 | Antonucci | Apr. 19, 1960 |

FOREIGN PATENTS

| 181,889 | Austria | May 10, 1955 |
| 597,417 | Germany | May 24, 1934 |